United States Patent Office 2,865,678
Patented Dec. 23, 1958

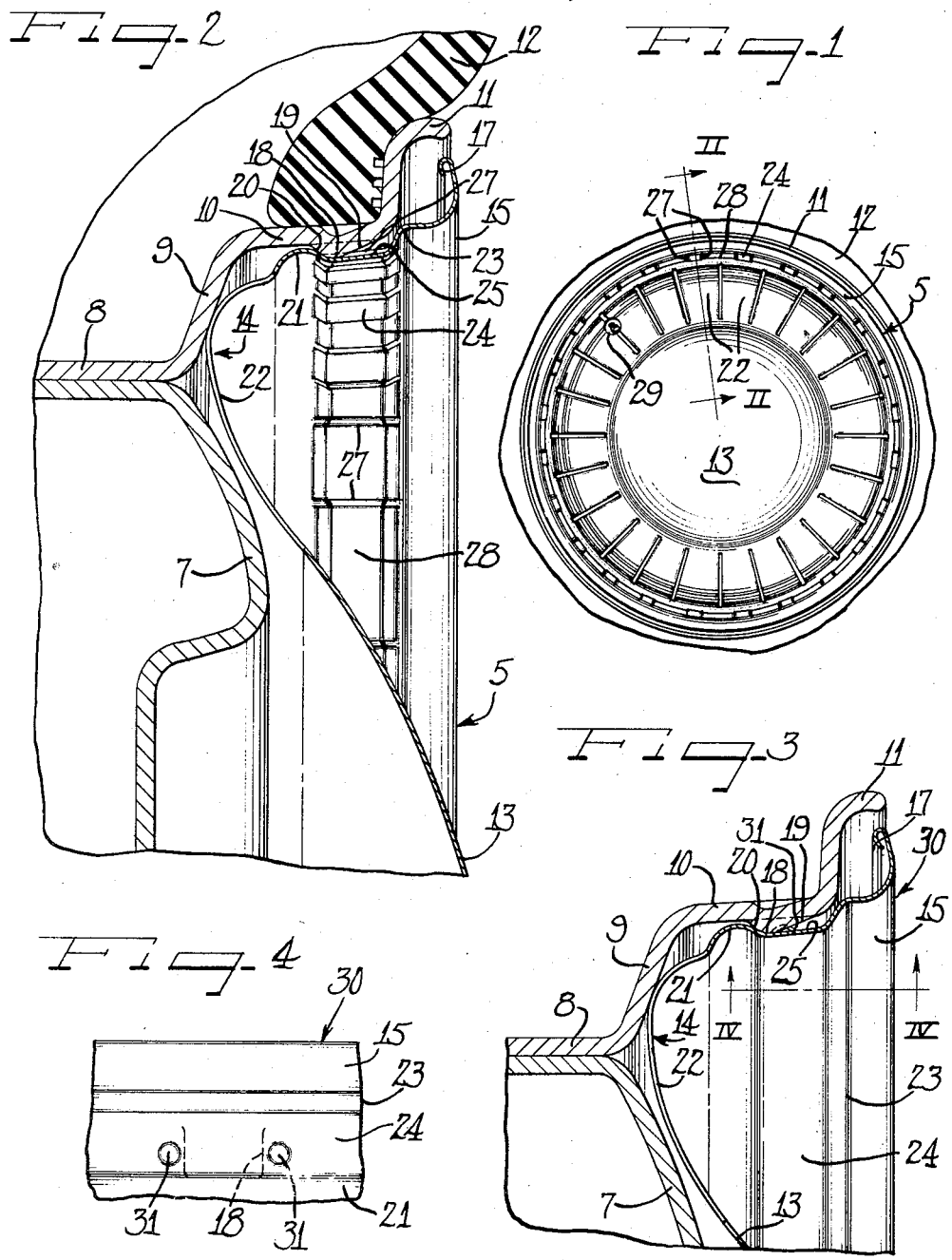

2,865,678

WHEEL COVER

George Albert Lyon, Detroit, Mich.

Application February 10, 1955, Serial No. 487,275

8 Claims. (Cl. 301—37)

The present invention relates to improvements in wheel structures and more particularly concerns the ornamental and protective covering of the outer sides of vehicle wheels.

An important object of the present invention is to provide an improved wheel structure including a novel cover arranged for snap-on pry-off assembly with the wheel in full supporting and retaining relation in cooperation with the tire rim of the wheel and also extending into covering relation over the wheel body.

Another object of the invention is to provide an improved wheel structure having novel cooperation between a cover and retaining bumps on a tire rim.

A further object of the invention is to provide an improved wheel cover for snap-on pry-off cooperation with retaining bumps on a tire rim.

Still another object of the invention is to provide an improved wheel cover for disposition at the outer side of a vehicle wheel provided with retaining bumps on the tire rim, and having novel bump engaging and turn-preventing structure.

Other objects, features and advantages of the present invention will be readily apparent from the following detailed description of certain preferred embodiments thereof taken in conjunction with the accompanying drawing in which:

Figure 1 is an outer side elevational view of a wheel structure embodying features of the invention;

Figure 2 is an enlarged fragmentary radial sectional view taken substantially on the line II—II of Figure 1;

Figure 3 is a fragmentary radial sectional view similar to Figure 2 but showing a modified cover construction; and Figure 4 is a fragmentary elevational detail view taken substantially along the plane of line IV—IV of Figure 3.

As shown in Figures 1 and 2, a one-piece sheet metal cover or trim member 5 is arranged to be applied in snap-on pry-off relation over the outer side of a vehicle wheel including a wheel body 7 marginally attached to a base flange 8 of a tire rim. From the base flange extends generally axially outwardly and radially sloping outwardly a side flange 9 which merges with a generally axially outwardly extending and obliquely radially outwardly sloping intermediate flange 10 from which extends at the axially outer side a generally radially outwardly and then axially outwardly turned terminal flange 11. The tire rim proves a multi-flange, drop-center seat for a pneumatic tire and tube assembly or a tubeless tire 12 as shown.

According to the present invention, the wheel cover 5 is constructed and arranged to be supported entirely by the tire rim in spaced relation to the wheel body 7 so as to be free from any tolerance requirements for accommodating manufacturing tolerances in the relative axial assembled relationship of the wheel body and the tire rim. Moreover, the cover 5 is so constructed and related to the tire rim that the cover is readily self-adjustable and conformable to resilient flexures or weaving of the tire rim in service as, for example, in going around curves and the like wherein, as is well known, the tire rim will flex or weave to accommodate load strains. To this end, the cover member 5 may be made from suitable sheet metal stock drawn to shape and having a substantial resiliency. Stainless steel, sheet brass, or other suitable sheet metal may be utilized for the purpose.

Although it is clear that the cover member 5 may be a trim ring cooperable with a hub cap at the center of the wheel, in the present instance, and as is generally desirable, the cover member is in the form of a full disk cover of a diameter to extend entirely across the wheel in substantially full covering relation to the wheel body and the tire rim. To this end, the cover member includes a central crown portion 13 for overlying the wheel body, an intermediate annular portion 14 for overlying the juncture between the wheel body and the tire rim and of generally dished form to extend down into the substantial axially outwardly opening groove between the wheel body and the tire rim. Radially outwardly from the intermediate portion 14 is an outer annular marginal generally rib-like substantially rigid portion 15 which is arranged to overlie the terminal flange 11 and provided with a substantial annular chamber within which wheel balancing weights may be accommodated. At its outer extremity, the marginal portion 15 has an underturned edge reinforcing and finishing bead 17.

For retaining the cover 5 on the wheel, the radially outer annular section of the intermediate portion 14 and the adjoining radially inner section of the marginal portion 15 cooperate to provide therebetween means for snap-on pry-off retaining engagement with generally radially inwardly projecting cover retaining bumps 18 formed on the intermediate flange 10 of the tire rim in the axially outer portion thereof and having respective axially and radially inwardly sloping oblique cam lead-in surfaces 19 and inner end generally radially outwardly and axially inwardly sloping retaining shoulders 20 facing generally axially inwardly.

The means on the cover for retaining interengagement with the retaining bumps 18, of which there may be three or four, as preferred, includes an annular generally radially outwardly projecting cover retaining resiliently flexible transversely outwardly arched, convex retaining shoulder rib 21 at the radially outer side of the intermediate cover portion 14 and spaced axially outwardly a sufficient distance from the bottom or inner area of the dished intermediate portion 14 so that when the inner area engages or bottoms against the side flange 9 of the tire rim, the retaining shoulder rib 21 will be in resiliently tensioned retaining interengagement with retaining shoulders 20 of the retaining bumps. It will be observed that the retaining shoulder rib 21 is of larger outside diameter than the minimum diameter described about the tips of the retaining bumps 18, but that the outside diameter of the rib 21 is slightly less than the diameter of the intermediate flange 10 of the wire rim immediately adjacent to the inner ends of the retaining bump shoulders 20.

In applying the cover to the outer side of the wheel, the retaining rib 21 may be initially disposed behind one or more of the bumps 18 by canted insertion of the cover into the wheel, and then the rib 21 is pressed axially inwardly over the lead-in cam surfaces 19 of the remaining retaining bumps and flexes radially inwardly until it snaps over the tips of the bumps and cams inwardly along the retaining shoulders 20 whereby to center and retain the cover on the wheel with the intermediate portion 14 bottoming against the side flange 9.

When thus fully seated on the wheel, the rib 21 is held in resilient tensioned engagement with the bump shoulders 20, and the intermediate portion 14 is held in resilient thrusting engagement against the side flange 9 so that the cover is in firm rattle-free assembly with the wheel.

For enhancing the resilient interengagement of the intermediate portion and the rib 21 with the tire rim, the intermediate portion 14 is preferably sub-divided into a plurality of generally radially extending spoke-like sections 22. By reason of the resiliently flexible nature of the spoke sections 22, facilitated by the inwardly longitudinally arched form thereof, they are individually flexibly deflectable under radially inward flexing of the retaining rib 21 at any point thereof and more especially in the areas thereof where engagement with the retaining bumps 18 is effected. In addition, the resiliency of the spoke-like sections 22 affords a cushioned engagement with the side flange 9 of the tire rim. After the retaining rib 21 has snapped behind the retaining bumps, the tension of the spoke-like sections 22 acts against the inner side of the rib 21 to enhance the resilient cooperation of the rib 21 with the retaining bump shoulders 20.

Axially outwardly from the retaining rib 21, the cover is preferably substantially rigid in structure so that it will well withstand curbing or other pressures such as pressure exerted thereagainst in snapping the cover into position on the wheel, and further, to withstand substantially without damage pry-off forces that may be applied thereto in dislodging the cover from the wheel. To this end, an annular rib-like generally axially inwardly directed shoulder 23 is provided at the radially inner side of the marginal portion 15 of the cover and arranged to lie in spaced adjacency to the shoulder at juncture of the intermediate flange 10 with the terminal flange 11 in the assembly. Between the reinforcing, pry-off shoulder 23 and the retaining rib 21, is an annular generally radially inwardly projecting annular rib 24 of substantial width affording a generally radially outwardly opening channel or groove 25 within which the retaining bumps 18 are accommodated within the assembly.

To afford additional rigidity for the rib structure 24, and also to provide means for holding the cover against turning on the wheel responsive to torque forces in service, inset, spaced shoulders 27 running transversely across the rib 24 and facing generally circumferentially toward one another are provided for disposition at opposite sides of the retaining bumps 18 for stop opposition to such sides and for thus retaining the cover against turning in either direction. By having the shoulders 27 provided by generally inset sections 28, a reasonably ornamental appearance is afforded and the portions of the rib 24 intermediate the inset areas 28 provide, in effect, radially outwardly opening pockets of recesses within which the retaining bumps 18 are accommodated. By preventing turning of the cover possible strains upon a valve stem 29 projecting through the intermediate portion 14 of the cover from a suitable aperture enlargement between a pair of the spoke sections 22 will be avoided.

When it is desired to remove the cover from the wheel, a pry-off tool (not shown) such as a screwdriver may be applied behind the outer marginal portion of the cover 15 and levered against the tire rim and against the unterturned reinforced edge portion 17 and against the pry-off shoulder 23.

In the modification of Figures 3 and 4, a cover 30 which is of substantially the same structure as the cover 5 is provided and is applicable to the outer side of a vehicle wheel of the same construction. Therefore, in order to expedite the description, identical features of not only the cover but also the wheel have thereon similar reference numerals. Snap-on pry-off cooperation of the cover 30 with the wheel is the same as described in connection with the cover 5. That is, the cover 30 is applied to the outer side of the wheel by snapping the retaining rib 21 of the cover over and into retaining engagement with the retaining bumps 18 of the wheel so that the rib 21 shoulders at its axially outer side against the retaining bump shoulders 20 under resilient tension and the spoke sections 22 resiliently engage under bottoming tension against the side flange 9 of the tire rim and exert resilient outward tensioning thrust against the retaining rib 21.

The principal differences in the cover 30 from the cover 5 are that instead of having the annular reinforcing and bump accommodating rib 24 and channel 25 sub-divided into a plurality of pockets and turn-preventing inset rib shoulders as in the cover 5, the rib 24 may be smoothly circular with one or more pairs of turn-preventing lugs or dimples 31 pressed therein to project radially outwardly at opposite sides of the area or areas thereof cooperable with one or more of the retaining bumps 18 in assembly. Thereby, the node-like turn-preventing elements or lugs 31 are disposed at respectively opposite sides of the associated bump 18 and are engageable therewith should there be a tendency for torque forces to cause turning of the cover in either direction on the wheel.

It will be understood that modifications and variations may be effected without departing from the scope of the novel concepts of the present invention.

I claim as my invention:

1. In a wheel structure including a wheel body and a tire rim with cover retaining bumps on a generally radially inwardly facing flange of the tire rim and projecting generally radially inwardly and spaced axially outwardly from a generally axially outwardly facing flange of the rim, a cover member for disposition at the outer side of the wheel including a generally axially extending portion of a diameter to fit clear within said radially facing rim flange and joining a dished annular portion extending generally radially inwardly therefrom, with an annular bump engaging continuous resiliently radially flexible rib projecting generally radially outwardly for cover retaining engagement behind said retaining bumps in resiliently flexible press-on, pry-off relation, said dished portion being divided into a plurality of resilient sections arranged to overlie and engage said axially outwardly facing rim flange thrustingly and thereby resiliently cooperating with the axially inner side of said rib for retaining the rib in cover engaging relation to the bumps.

2. In a wheel structure including a wheel body and a tire rim with cover retaining bumps on a generally radially inwardly facing flange of the tire rim spaced axially outwardly from a generally axially outwardly facing flange of the rim, a cover member for disposition at the outer side of the wheel including a generally axially extending portion of a diameter to fit clear within said radially facing rim flange and joining a dished annular portion extending generally radially inwardly therefrom, with an annular bump engaging rib projecting generally radially outwardly for cover retaining engagement behind said retaining bumps, said dished portion being divided into a plurality of resilient sections arranged to overlie said axially outwardly facing rim flange and resiliently cooperating with said rib for retaining the rib in cover engaging relation to the bumps, said resilient sections thrusting resiliently against said axially outwardly facing flange.

3. In a wheel structure including a wheel body and a tire rim with cover retaining bumps on a generally radially inwardly facing flange of the tire rim spaced axially outwardly from a generally axially outwardly facing flange of the rim, a cover member for disposition at the outer side of the wheel including a generally axially extending portion of a diameter to fit clear within said radially facing rim flange and joining a dished annular portion extending generally radially inwardly therefrom, with an annular bump engaging rib projecting generally radially outwardly for cover retaining engagement behind said retaining bumps, said dished portion being divided into a plurality of resilient sections arranged to overlie said axially outwardly facing rim flange and resiliently cooperating with said rib for retaining the rib in cover engaging relation to the bumps, said axially extending cover portion having an intermediate annular radially outwardly facing channel therein receptive of said retaining bumps and defined by a pry-off shoulder at the axially outer side thereof.

4. In a wheel structure including a wheel body and a tire rim with cover retaining bumps on a generally radially inwardly facing flange of the tire rim spaced axially outwardly from a generally axially outwardly facing flange of the rim, a cover member for disposition at the outer side of the wheel including a generally axially extending portion of a diameter to fit clear within said radially facing rim flange and joining a dished annular portion extending generally radially inwardly therefrom, with an annular bump engaging rib projecting generally radially outwardly for cover retaining engagement behind said retaining bumps, said dished portion being divided into a plurality of resilient sections arranged to overlie said axially outwardly facing rim flange and resiliently cooperating with said rib for retaining the rib in cover engaging relation to the bumps, said axially extending cover portion having an annular radially outwardly facing channel therein receptive of said retaining bumps, said channel being provided with radially outwardly projecting means for disposition at the opposite sides of a retaining bump to hold the cover against turning.

5. In a wheel structure including a wheel body and a tire rim with cover retaining bumps on a generally radially inwardly facing flange of the tire rim spaced axially outwardly from a generally axially outwardly facing flange of the rim, a cover member for disposition at the outer side of the wheel including a generally axially extending portion of a diameter to fit clear within said radially facing rim flange and joining a dished annular portion extending generally radially inwardly therefrom, with an annular bump engaging rib projecting generally radially outwardly for cover retaining engagement behind said retaining bumps, said dished portion being divided into a plurality of resilient sections arranged to overlie said axially outwardly facing rim flange and resiliently cooperating with said rib for retaining the rib in cover engaging relation to the bumps, said axially extending cover portion having an annular radially outwardly facing channel therein receptive of said retaining bumps, said channel being provided with radially outwardly projecting means for disposition at the opposite sides of a retaining bump to hold the cover against turning, said turn-preventing means comprising elongated shoulders opposing the sides of the retaining bump.

6. In a wheel structure including a wheel body and a tire rim with cover retaining bumps on a generally radially inwardly facing flange of the tire rim spaced axially outwardly from a generally axially outwardly facing flange of the rim, a cover member for disposition at the outer side of the wheel including a generally axially extending portion of a diameter to fit clear within said radially facing rim flange and joining a dished annular portion extending generally radially inwardly therefrom, with an annular bump engaging rib projecting generally radially outwardly for cover retaining engagement behind said retaining bumps, said dished portion being divided into a plurality of resilient sections arranged to overlie said axially outwardly facing rim flange and resiliently cooperating with said rib for retaining the rib in cover engaging relation to the bumps, said axially extending cover portion having an annular radially outwardly facing channel therein receptive of said retaining bumps, said channel being provided with radially outwardly projecting means for disposition at the opposite sides of a retaining bump to hold the cover against turning, said projecting means comprising a pair of nodes dimpled in the base wall of the channel.

7. In a cover for disposition at the outer side of a vehicle wheel having a rim flange with radially inwardly projecting cover retaining bumps thereon, which provide both generally axially inwardly and circumferentially facing shoulders, a cover member having circular radially spaced portions connected by an intermediate annular portion of substantial width, said intermediate portion and the radially outer circular portion of the cover having adjacent juncture thereof an annular continuous resilient generally radially outwardly projecting cover retaining rib which is engageable retainingly with the axially facing shoulders of the bumps on the tire rim, said intermediate portion radially inwardly from said rib being subdivided into a plurality of axially resiliently deflectable sections that are cooperable with said rib to afford radially outward tensioning thrust thereto at points thereof which are resiliently deflected generally radially inwardly on engagement with the cover retaining bumps, and means on the cover adjacent to said rib circumferentially opposing at least certain of the circumferentially facing shoulders of the bumps to retain the cover against turning relative to the wheel.

8. In a cover structure for a wheel including tire rim and body parts one of which has generally radially extending spaced protuberances disposed generally in a common circle about the axis of the wheel, a metallic circular cover member having an outer marginal annular edge portion merging into a dished curved inner portion with an annular shoulder at the junction of said portions, said outer portion having recesses axially outwardly offset relative to said shoulder and each recess being defined on one of its sides by said shoulder, said shoulder being common to all said recesses and being resiliently deflectable radially when pressed against said wheel protuberances for entry of said protuberances in recesses to retain the cover on the wheel and against turning, said shoulder comprising an edge for bottoming on the wheel axially inward and radially behind said protuberances, said outer portion having extending axially and radially outwardly therefrom a marginal cover portion provided with a plurality of reinforced annular shoulders for receiving a pry-off tool.

References Cited in the file of this patent

UNITED STATES PATENTS

| | | |
|---|---|---|
| 2,127,598 | Horn | Aug. 23, 1938 |
| 2,308,617 | Lyon | Jan. 19, 1943 |
| 2,660,480 | Lyon | Nov. 24, 1953 |
| 2,669,487 | Horn | Feb. 16, 1954 |

FOREIGN PATENTS

| | | |
|---|---|---|
| 830,302 | Germany | Feb. 4, 1952 |